US010872586B2

(12) United States Patent
Koyama

(10) Patent No.: US 10,872,586 B2
(45) Date of Patent: Dec. 22, 2020

(54) DISPLAY CONTROL DEVICE FOR VEHICLE AND DISPLAY UNIT FOR VEHICLE

(71) Applicant: DENSO CORPORATION, Kariya (JP)

(72) Inventor: Hirotaka Koyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/544,185

(22) Filed: Aug. 19, 2019

(65) Prior Publication Data
US 2019/0371281 A1 Dec. 5, 2019

Related U.S. Application Data

(63) Continuation of application No. PCT/JP2018/003735, filed on Feb. 5, 2018.

(30) Foreign Application Priority Data

Mar. 21, 2017 (JP) ................. 2017-054768

(51) Int. Cl.
G09G 5/38 (2006.01)
G02B 27/01 (2006.01)
G09G 5/14 (2006.01)
G08G 1/0962 (2006.01)
B60R 1/00 (2006.01)

(52) U.S. Cl.
CPC ............... G09G 5/38 (2013.01); B60R 1/00 (2013.01); G02B 27/0101 (2013.01); G08G 1/09623 (2013.01); G09G 5/14 (2013.01); B60R 2300/205 (2013.01); G02B 2027/0141 (2013.01); G09G 2354/00 (2013.01); G09G 2380/10 (2013.01)

(58) Field of Classification Search
CPC ........ G09G 5/38; G09G 5/14; G09G 2354/00; B60R 1/00; B60R 2300/205; G02B 27/0101; G02B 2027/0141; G08G 1/09623
USPC ....................................................... 340/435
See application file for complete search history.

(56) References Cited

U.S. PATENT DOCUMENTS

2010/0302361 A1    12/2010  Yoneyama et al.
2011/0037618 A1*   2/2011   Ginsberg ......... G08G 1/096775
                                                                 340/905

(Continued)

FOREIGN PATENT DOCUMENTS

JP    2008221973 A    9/2008
JP    2010282278 A    12/2010
JP    20166602 A      1/2016

Primary Examiner — Omar Casillashernandez
(74) Attorney, Agent, or Firm — Harness, Dickey & Pierce, P.L.C.

(57) ABSTRACT

A vehicle display control device for a vehicle: controls a display device for displaying information in a display region in front of a driver's seat of a vehicle; identifies an effective range of a traffic regulation indicated by a traffic regulation mark; identifies a remaining amount, which is at least one of a remaining travel distance and a remaining travel time required from a vehicle position of the vehicle to an end point of the effective range; and controls the display device to display remaining amount information indicating the remaining amount, in addition to traffic regulation content information indicating a content of the traffic regulation in the effective range, in the display region when the vehicle enters into the effective range.

12 Claims, 8 Drawing Sheets

(56) References Cited

U.S. PATENT DOCUMENTS

| | | | |
|---|---|---|---|
| 2013/0103313 A1* | 4/2013 | Moore | G01C 21/3673 |
| | | | 701/533 |
| 2014/0066091 A1* | 3/2014 | Varoglu | H04W 4/025 |
| | | | 455/456.1 |
| 2014/0114575 A1* | 4/2014 | Alders | G01C 21/3697 |
| | | | 701/538 |
| 2015/0367779 A1 | 12/2015 | Ohdachi et al. | |
| 2017/0116853 A1* | 4/2017 | Hu | B60R 1/00 |
| 2018/0075739 A1* | 3/2018 | Ginsberg | G08G 1/0133 |
| 2019/0244553 A1* | 8/2019 | Irzyk | B60K 35/00 |

* cited by examiner

K

L

M

N

US 10,872,586 B2

DISPLAY CONTROL DEVICE FOR VEHICLE AND DISPLAY UNIT FOR VEHICLE

CROSS REFERENCE TO RELATED APPLICATION

The present application is a continuation application of International Patent Application No. PCT/JP2018/003735 filed on Feb. 5, 2018, which designated the U.S. and claims the benefit of priority from Japanese Patent Application No. 2017-54768 filed on Mar. 21, 2017. The entire disclosures of all of the above applications are incorporated herein by reference.

TECHNICAL FIELD

The present disclosure relates to a display control device for a vehicle and a display unit for a vehicle including the display control device for a vehicle and a display device.

BACKGROUND

A technique is provided to recognize a traffic sign and an auxiliary sign from an image obtained by capturing a front of a vehicle and to determine whether the vehicle is within an effective range identified by a traffic sign and an auxiliary sign with the use of map information, thereby to attempt to enable accurate presentation of the traffic sign to a driver.

SUMMARY

A vehicle display control device for a vehicle: controls a display device for displaying information in a display region in front of a driver's seat of a vehicle; identifies an effective range of a traffic regulation indicated by a traffic regulation mark; identifies a remaining amount, which is at least one of a remaining travel distance and a remaining travel time required from a vehicle position of the vehicle to an end point of the effective range; and controls the display device to display remaining amount information indicating the remaining amount, in addition to traffic regulation content information indicating a content of the traffic regulation in the effective range, in the display region when the vehicle enters into the effective range.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
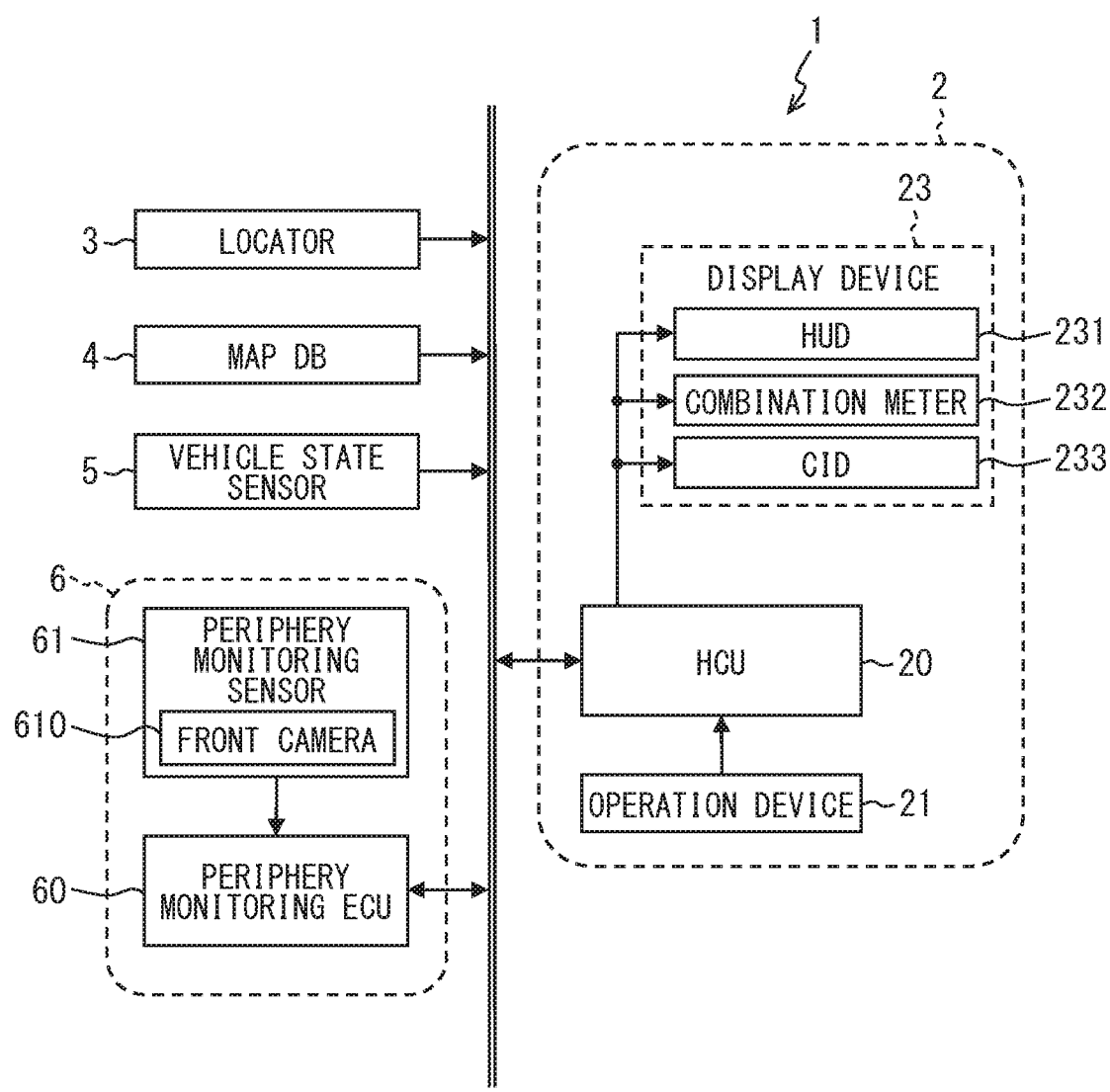
FIG. 1 is a diagram showing an example of a schematic configuration of a vehicle system.

In the technique described above, since whether or not the vehicle is within the effective range of the traffic sign can be merely determined and presented, there is a problem that the driver cannot easily recognize a state of the host vehicle with respect to the effective range of the traffic sign such as an extent to which the traffic sign is effective.

Thus, a display control device for a vehicle and a display unit for a vehicle are provided, which are capable of more accurately presenting the content of a traffic regulation mark of at least one of a traffic sign and a road marking to a driver, while enabling the driver to easily recognize a situation of a host vehicle with respect to an effective range of the traffic regulation mark.

According to an example embodiment, a vehicle display control device for a vehicle includes: a display control unit that controls a display device for displaying information in a display region in front of a driver's seat of a vehicle; an effective range identification unit that identifies an effective range of a traffic regulation indicated by a traffic regulation mark, which is at least one of a traffic sign or a road marking on a travelling road of the vehicle; and a remaining amount identification unit that identifies a remaining amount, which is at least one of a remaining travel distance and a remaining travel time required from a vehicle position of the vehicle to an end point of the effective range. When the vehicle enters into the effective range, the display control unit controls the display device to display remaining amount information indicating the remaining amount identified by the remaining amount identification unit, in addition to traffic regulation content information indicating a content of the traffic regulation in the effective range, in the display region.

According to the vehicle display control device described above, since the effective range of the regulation indicated by the traffic regulation mark which is at least one of the traffic sign and the road marking on a course of the host vehicle is identified, and the regulation content information indicating the content of the regulation in the effective range is displayed in the display region when the host vehicle enters the effective range, the regulation content information can be displayed in the display region with high accuracy when the host vehicle is located in the effective range.

Further, when the host vehicle enters the effective range, the remaining amount information indicating the remaining amount which is at least one of the remaining travel distance and the remaining travel time required until the end of the effective range of the regulation indicated by the traffic regulation mark is displayed in the display region, so that the driver can more easily recognize the situation of the host vehicle with respect to the effective range. This makes it possible to allow the driver to easily recognize the situation of the host vehicle with respect to the effective range of the traffic regulation mark while being capable of more accurately presenting the content of the traffic regulation mark of at least one of the traffic sign and the road marking to the driver.

According to an example embodiment, a vehicle display unit for a vehicle includes: a display device that displays information in a display region in front of a driver's seat of a vehicle; and the vehicle display control device according to the first aspect.

According to the vehicle display described above, since the inclusion of the vehicle display control device described above enables the driver to easily recognize the situation of the host vehicle with respect to the effective range of the traffic regulation mark while making it possible to more accurately present the content of the traffic regulation mark of at least one of the traffic sign and the road marking to the driver.

Multiple embodiments for disclosure will be described with reference to the drawings. For convenience of description, the same reference numerals are assigned to portions having the same functions as those illustrated in the drawings used in the description so far among the plurality of embodiments, and a description of the same portions may be omitted. The description of other embodiments can be referred to for portions to which the same reference numerals are assigned.

First Embodiment

<Schematic Configuration of Vehicle System 1>

Hereinafter, the present embodiment will be described with reference to the drawings. A vehicle system 1 shown in FIG. 1 is used in a vehicle such as an automobile, and includes an HMI (Human Machine Interface) system 2, a locator 3, a map database (hereinafter, referred to as a map DB) 4, a vehicle state sensor 5, and a periphery monitoring system 6. It is assumed that the HMI system 2, the locator 3, the map DB 4, the vehicle state sensor 5, and the periphery monitoring system 6 are connected to, for example, an in-vehicle LAN. Hereinafter, the vehicle using the vehicle system 1 will be referred to as a host vehicle.

The locator 3 includes a GNSS (Global Navigation Satellite System) receiver and an inertial sensor. The GNSS receiver receives positioning signals from multiple satellites. The inertial sensor includes, for example, a three-axis gyro sensor and a three-axis acceleration sensor. The locator 3 combines the positioning signals received by the GNSS receiver with the measurement results of the inertial sensors to sequentially measure the vehicle position of the host vehicle on which the locator 3 is mounted. The vehicle position may be measured with the use of a travel distance obtained from signals sequentially output from a vehicle speed sensor mounted on the host vehicle.

The map DB 4 is a nonvolatile memory and stores map data such as link data and node data. The link data includes various pieces of data such as an link ID identifying a link, a link length indicating a length of the link, a link azimuth, a link travel time, link shape information, node coordinates (latitude/longitude) between a beginning and an end of the link, and road attributes. The road attribute data includes, for example, data (hereinafter, referred to as regulation data) on regulation by a traffic regulation mark, which is at least one of a traffic sign and a road marking. Examples of such regulations include a speed limit, no parking, no overtaking, no vehicle crossing, and the like. When an effective range exists in the regulation by the traffic regulation mark, the link data also includes data of the effective range (hereinafter, referred to as effective range data). The regulation data and the effective range data may be stored in the map DB 4 as data other than the link data. The node data includes a various pieces of data such as a node ID in which a unique number is assigned to each node on a map, node coordinates, a node name, a node type, a connection link ID in which a link ID of a link connected to the node is described, an intersection type, and the like.

The vehicle state sensor 5 is a sensor group for detecting a traveling state of the host vehicle. The vehicle state sensor 5 includes a vehicle speed sensor for detecting a vehicle speed of the vehicle. The vehicle state sensor 5 outputs the detection result to the in-vehicle LAN. The detection result from the vehicle state sensor 5 may be output to the vehicle LAN through an ECU mounted on the host vehicle.

The periphery monitoring system 6 includes a periphery monitoring ECU 60 and a periphery monitoring sensor 61. The periphery monitoring system 6 recognizes a traveling environment of the host vehicle. The periphery monitoring sensor 61 detects obstacles such as a stationary object and a moving object around the host vehicle, and detects road markings such as traffic signs, road markings, and traveling lane markings. The periphery monitoring sensor 61 may be configured by a front camera 610 having a predetermined range in front of the host vehicle as an imaging range. For example, the front camera 610 may be provided on an inner rearview mirror of the host vehicle. The front camera 610 may be provided on an upper surface of an instrument panel of the host vehicle. The periphery monitoring sensor 61 may be configured by cameras for capturing images other than the front of the host vehicle, or may be configured by a millimeter wave radar, a sonar, a LIDAR (Light Detection and Ranging/Laser Imaging Detection and Ranging) or the like.

The periphery monitoring ECU 60 is mainly configured by a processor, a volatile memory, a non-transitory tangible storage medium such as a nonvolatile memory, an I/O, and a microcomputer including buses for connecting those components, and executes various processes by executing control programs stored in the non-volatile memory. The periphery monitoring ECU 60 recognizes the traveling environments of the host vehicle from the detection result by the periphery monitoring sensor 61. For example, the periphery monitoring ECU 60 recognizes the traffic regulation marks and recognizes the presence or absence of a preceding vehicle from a captured image (hereinafter, front image) acquired from the front camera 610 by a well-known image recognizing process such as pattern matching. The recognition of the traffic regulation mark in the periphery monitoring ECU 60 preferably includes the recognition of the content of an auxiliary sign of the traffic regulation marks in addition to the recognition of the content of the regulation indicated by the traffic regulation mark. The content of the auxiliary sign may be recognized with the use of pattern matching, or may be recognized with the use of a well-known character line detection technique.

The HMI system 2 includes an HCU (Human Machine Interface Control Unit) 20, an operation device 21, and a display device 23 for accepting input operation from a driver of the host vehicle and presenting information to the driver of the host vehicle. The operation device 21 is a switch group operated by the driver of the host vehicle. The operation device 21 is used to perform various settings. For example, the operation device 21 may be configured by a steering switch or the like provided in a spoke portion of a steering wheel of the host vehicle.

The display device 23 displays information based on an instruction from the HCU 20, to thereby present information to the driver. Examples of the display device 23 include a HUD (Head-Up Display) 231, a combination meter 232, and a CID (Center Information Display) 233. The HUD 231 projects a light of a display image based on the image data acquired from the HCU 20 onto a projection region in front of the driver's seat of the host vehicle, to thereby display a virtual image of the display image superimposed on a part of a foreground so as to be able to be visually recognized by the driver. The combination meter 232 and the CID 233 display information by, for example, a liquid crystal display. The combination meter 232 is disposed on the instrument panel in front of the driver's seat. The CID 233 is located above a center cluster.

In the present embodiment, as the HUD 231, a device capable of displaying a virtual image of each display image so as to be able to be visually recognized by driver by projecting the display images onto respective projection regions having two different positions from each other will be exemplified. Now, the HUD 231 according to the present embodiment will be described with reference to FIG. 2.

Figure 2:
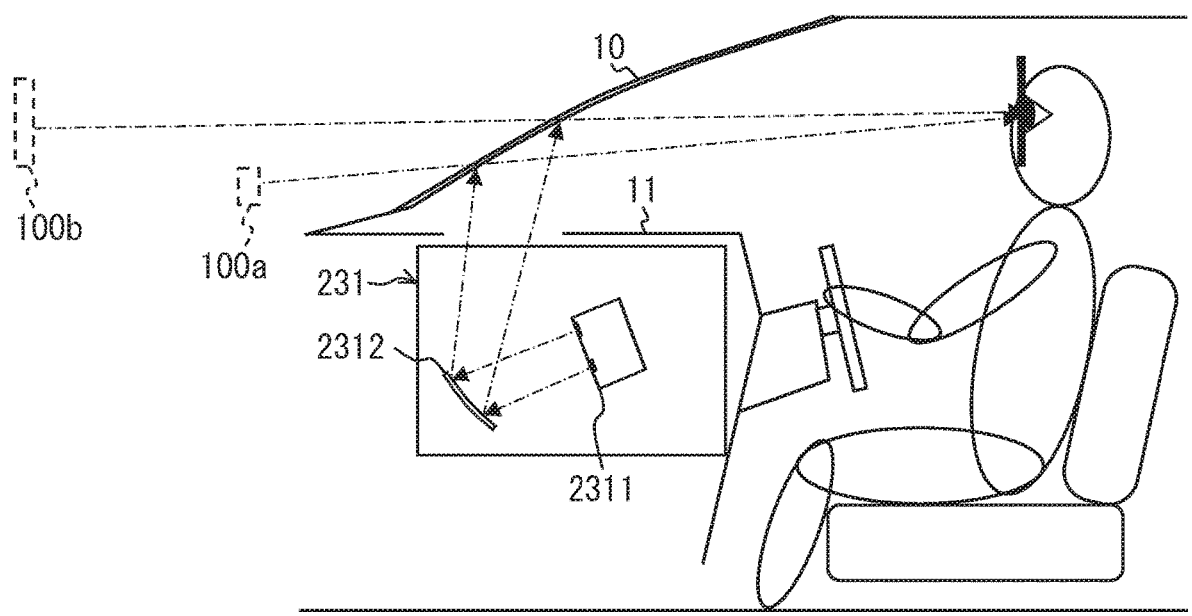
FIG. 2 is a diagram showing an example in which an HUD is mounted on a vehicle.

As shown in FIG. 2, the HUD 231 is provided on an instrument panel 11 of the host vehicle. The HUD 231 projects a displayed image formed by a projector 2311 such as a liquid crystal projector or a scan projector, through an optical system 2312, such as a concave mirror, onto a projection region defined in a front windshield 10 as a projection member. The projector 2311 projects multiple display images onto projection regions having different positions by different optical paths. A light beam of the display image reflected by the front windshield 10 to an inside of a vehicle compartment is perceived by the driver seated in the driver's seat. In addition, a light beam from the foreground as a scene existing in front of the host vehicle, which has passed through the front windshield 10 formed by a light translucent glass, is also perceived by the driver seated in the driver's seat. As a result, the driver can visually recognize virtual images 100a and 100b of the multiple display images formed in front of the front windshield 10 so as to overlap with a part of the foreground. In other words, the HUD 231 superimposes and displays the respective virtual images 100a and 100b on the foreground of the host vehicle, to thereby realize a so-called AR (Augmented Reality) display.

A projection member on which the HUD 231 projects the displayed image is not limited to the front windshield 10, and may be a light translucent combiner or the like.

As shown in FIG. 2, the virtual images 100a and 100b displayed by the HUD 231 include a proximal virtual image 100a and a distal virtual image 100b. A range in which the distal virtual image 100b can be displayed (hereinafter, referred to as a proximal display region) and a range in which the proximal virtual image 100a can be displayed (hereinafter, referred to as a distal display region) are each formed in a horizontally long rectangular shape with sides in a vehicle width direction being longer. It is assumed that a size of the distal display region is set to be larger than that of the proximal display region.

In addition, the proximal virtual image 100a and the distal virtual image 100b are imaged at different positions in a front-rear direction of the host vehicle in view of the driver's visibility. The proximal virtual image 100a is imaged closer to the front windshield 10 than the distal virtual image 100b. Further, the proximal virtual image 100a and the distal virtual image 100b are formed at positions shifted in a vertical direction in view of the driver' visibility. In other words, the images are formed at positions which are also shifted in the vertical direction. More specifically, the image forming position of the proximal virtual image 100a is set to be lower than the imaging position of the distal virtual image 100b. Further, it is preferable that the image forming position of the distal virtual image 100b is set so as to be approximately the same height as an eye point of the driver in view of the driver's visibility.

In view of the driver's visibility, a lower edge portion of the distal virtual image 100b may be positioned lower than an upper edge portion of the proximal virtual image 100a. For example, the distal display region may be a rectangular shape that is partially cut away so as to avoid the proximal display region. A lower side of the distal display region and an upper side of the proximal display region may be separated from each other in the vertical direction.

The HCU 20 is mainly configured by a processor, a volatile memory, a non-transitory tangible storage medium such as a nonvolatile memory, an I/O, and a microcomputer including buses for connecting those components, and is connected to the operation device 21, the display device 23, and the in-vehicle LAN. The HCU 20 executes various processes by executing control programs stored in the non-volatile memory. For example, the HCU 20 controls the display by the HUD 231. This HCU 20 corresponds to a display control device for a vehicle, and the configuration including the HCU 20 and the display device 23 corresponds to a vehicle-side display unit. The configuration of the HCU 20 relating to the control of display by the HUD 231 will be described in detail below.

<Schematic Configuration of HCU 20>

Figure 3:
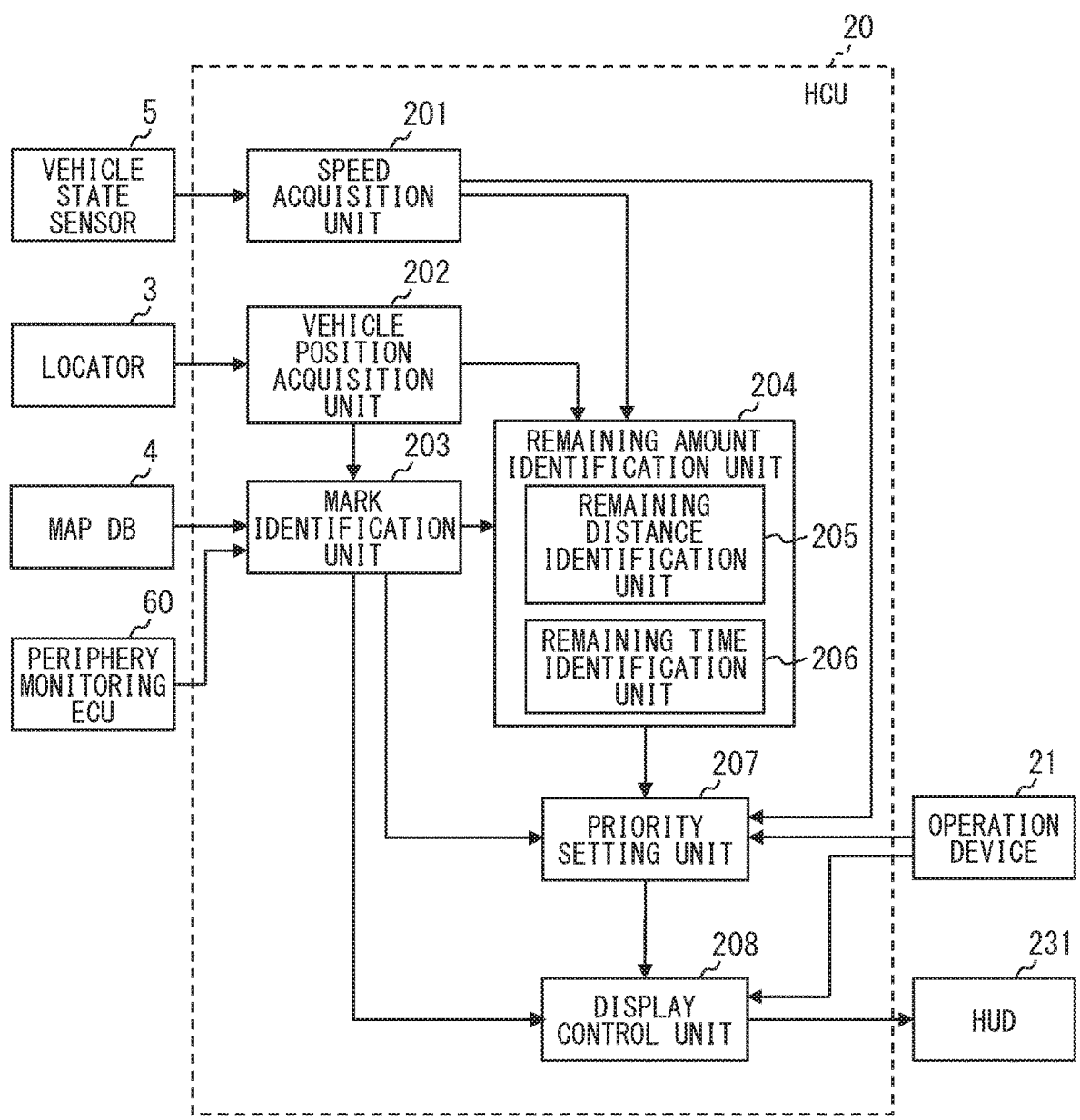
FIG. 3 is a diagram showing an example of a schematic configuration of an HCU.

Here, a schematic configuration of the HCU 20 will be described with reference to FIG. 3. As shown in FIG. 3, the HCU 20 includes, as functional blocks, a speed acquisition unit 201, a vehicle position acquisition unit 202, a mark identification unit 203, a remaining amount identification unit 204, a priority setting unit 207, and a display control unit 208 for controlling display by the HUD 231. Some or all of the functions executed by the HCU 20 may be configured as hardware by one or more ICs or the like. In addition, some or all of the functional blocks of the HCU 20 may be implemented by a combination of software executed by a processor and hardware members.

The speed acquisition unit 201 acquires a speed of the host vehicle from the vehicle speed sensor of the vehicle state sensor 5. The vehicle position acquisition unit 202 acquires a vehicle position of the host vehicle measured by the locator 3. The mark identification unit 203 identifies a traffic regulation mark existing ahead of the course of the host vehicle, and identifies an effective range of the regulation indicated by the traffic regulation mark. The traffic regulation mark may be a traffic sign or a road marking as long as the traffic regulation mark has an effective range of regulation, but in the present embodiment, a case in which a traffic sign indicating a regulation for prohibiting or designating a specific traffic method is used as a traffic regulation mark will be described below as an example.

The mark identification unit 203 identifies a traffic regulation mark indicated by regulation data as the traffic regulation mark existing ahead of the course of the host vehicle when there is the traffic regulation mark linked to a link ahead of the course of the host vehicle according to the vehicle position of the host vehicle acquired by the vehicle position acquisition unit 202 and the above-mentioned regulation data of the map data stored in the map DB 4. In addition, when the traffic regulation mark can be recognized from the front image by the periphery monitoring ECU 60, the mark identification unit 203 may identify the traffic regulation mark as a traffic regulation mark existing ahead of the course of the host vehicle.

The mark identification unit 203 identifies the range in which the regulation indicated by the traffic regulation mark is effective (hereinafter referred to as the regulation effective range) when identifying the traffic regulation mark existing ahead of the course of the host vehicle. Therefore, the mark identification unit 203 corresponds to an effective range identification unit. The mark identification unit 203 may be configured to identify the regulation effective range according to the above-mentioned effective range data among the map data stored in the map DB 4. Alternatively, when the content of an auxiliary sign of the traffic regulation marks can be recognized by the periphery monitoring ECU 60 according to the front images acquired from the front camera 610, the mark identification unit 203 may identify the regulation effective range according to the content of the auxiliary sign. For example, when the content of the auxiliary sign such as "100 m ahead" can be recognized, the regulation effective range may be identified as 100 m.

The remaining amount identification unit 204 identifies the remaining amount (hereinafter referred to as a starting remaining amount) required from the vehicle position of the host vehicle to a start position of the regulation effective range, or identifies the remaining amount (hereinafter referred to as an ending remaining amount) required from the vehicle position of the host vehicle to an end position of the regulation effective range. As an example, the remaining amount identification unit 204 identifies the starting remaining amount when a distance from the vehicle position of the host vehicle to the start position of the regulation effective range becomes equal to or less than a set value that can be arbitrarily set. The distance from the vehicle position of the host vehicle to the start position of the regulation effective range may be calculated according to the vehicle position of the host vehicle acquired by the vehicle position acquisition unit 202 and the map data stored in the map DB 4. Alternatively, the distance from the host vehicle to the start position of the regulation effective range, which is recognized by the periphery monitoring ECU 60, may be used. In that instance, the start position of the regulation effective range may be identified from the fact that the content of the auxiliary sign such as "from here" indicating the start position of the regulation effective range is recognized by the periphery monitoring ECU 60. The starting remaining amount may be sequentially identified until the host vehicle enters the regulation effective range, or may be identified once when the distance from the vehicle position of the host vehicle to the start position of the regulation effective range becomes equal to or less than a set value that can be arbitrarily set.

Further, the remaining amount identification unit 204 may be configured to start identifying the ending remaining amount when the host vehicle enters the regulation effective range. The fact that the host vehicle has entered the regulation effective range may be determined according to the fact that the content of the auxiliary sign such as "from here" indicating the start position of the regulation effective range is recognized by the periphery monitoring ECU 60. In addition, it may be determined according to the vehicle position of the host vehicle and the effective range data of the map data. As an example, the remaining amount identification unit 204 may be configured to sequentially identify the ending remaining amount of the regulation effective range up to the end position of the regulation effective range to be targeted. The remaining amount identification unit 204 may determine the end position of the regulation effective range according to the fact that the content of the auxiliary sign such as "up to here" indicating the end position of the regulation effective range is recognized by the periphery monitoring ECU 60, or according to the fact that the identified remaining amount becomes 0.

The remaining amount identification unit 204 includes a remaining distance identification unit 205 and a remaining time identification unit 206. The remaining distance identification unit 205 identifies a remaining travel distance as the remaining amount, and the remaining time identification unit 206 identifies a remaining travel time as the remaining amount. In the case of identifying the remaining travel distance as the starting remaining amount, the remaining distance identification unit 205 may identify the travel distance from the vehicle position of the host vehicle to the start position of the regulation effective range as the remaining travel distance. On the other hand, in the case of identifying the remaining travel distance as the ending remaining amount, the remaining distance identification unit 205 may identify the remaining travel distance by subtracting the travel distance after the host vehicle has entered the regulation effective range from the distance corresponding to the regulation effective range.

The remaining time identification unit 206 may identify the remaining travel time as the starting remaining amount and the remaining travel time as the ending remaining amount by dividing the remaining travel distance described above by the speed of the host vehicle obtained by the speed acquisition unit 201. As the speed of the host vehicle, an average speed in a predetermined period which can be arbitrarily set may be used.

The priority setting unit 207 sets the priorities of the traffic regulation marks when the host vehicle is located in a region in which the regulation effective ranges indicated by the traffic regulation marks of multiple types overlap with each other. In other words, the priority setting unit 207 sets the priorities of the traffic regulation marks when there are the multiple types of effective traffic regulation marks in which the host vehicle is located within the regulation effective range.

As an example, the priority setting unit 207 may be configured to set the priority of the traffic regulation mark corresponding to the regulation effective range whose remaining amount identified by the remaining amount identification unit 204 is small to be higher. The priority setting unit 207 may be configured to be set in accordance with a selection by the driver received through the operation device 21. The operation device 21 corresponds to a user interface. The selection by the driver may be accepted through a microphone when the speech recognition unit is used in the host vehicle. Alternatively, the priority setting unit 207 may set the priority of the traffic regulation mark according to the type of the traffic regulation mark. In that instance, a correspondence between the type and the priority of the traffic regulation marks may be stored in advance in the nonvolatile memory of the HCU 20, and the priority of the traffic regulation mark may be set by referring to the correspondence.

Further, the priority setting unit 207 may be configured to set the priority of the traffic regulation mark in accordance with the type of the traffic regulation mark and a traveling state of the host vehicle. In other words, the priority of the traffic regulation mark may be switched according to the traveling state of the host vehicle. In that case, the priority setting unit 207 may be configured to set the priority of the traffic regulation mark, which is estimated to be likely to be a target in the traveling state of the host vehicle, to be higher. A correspondence between the type and the priority of the traffic regulation marks may be stored in advance in the nonvolatile memory of the HCU 20, and the priority of the traffic regulation mark may be set by referring to the correspondence. Examples of the traveling state of the host vehicle include a speed of the host vehicle, the presence or absence of a preceding vehicle, and the like. The speed of the host vehicle may be acquired by the speed acquisition unit 201, or the presence or absence of the preceding vehicle may be determined according to the traveling environments recognized by the periphery monitoring ECU 60.

An example of setting the priority of the traffic regulation mark according to the type of the traffic regulation mark and the traveling state of the host vehicle is as follows. In this example, a description will be made taking "speed limit," "no parking," and "no overtaking" as examples of the traffic regulation marks. For example, when the speed of the host vehicle is less than a set value, the priority of "no parking" is set to be higher than the priority of "speed limit", while when the speed of the host vehicle is equal to or higher than the set value, the priority of "speed limit" is set to be higher than the priority of "no parking". In the case where there is a preceding vehicle, the priority of "no overtaking" may be set to be higher than the priority of "limit speed", while in the case where there is no preceding vehicle, the priority of "speed limit" may be set to be higher than the priority of "no overtaking".

In the present embodiment, a case where the priority setting unit 207 sets a higher priority for the traffic regulation mark corresponding to the regulation effective range whose remaining amount identified by the remaining amount identification unit 204 is small will be described below as an example.

The display control unit 208 causes the HUD 231 to display the remaining amount information indicating the remaining amount of the regulation effective range identified by the remaining amount identification unit 204, in addition to the regulation content information indicating the content of the regulation of the regulation effective range, in accordance with the situation of the host vehicle with respect to the regulation effective range. The regulation content information may be text information, an icon image, or a combination of the text information with the icon image as long as the regulation content information indicates the content of the regulation in the regulation effective range. In the present embodiment, a case in which an icon image of a traffic regulation mark corresponding to the content of regulation in the regulation effective range is used as the regulation content information will be exemplified and the following description will be continued. The remaining amount information may be text information, an image such as a bar graph, or a combination of the text information with the image as long as the remaining amount information is indicative of the remaining amount. In the present embodiment, a case in which text information indicating the remaining amount is used as the remaining amount information will be exemplified and the following description will be continued.

The display control unit 208 switches the display region in which the regulation content information and the remaining amount information are displayed to the proximal display region and the distal display region, according to the situation of the host vehicle with respect to the regulation effective range. In addition, the display control unit 208 causes the latest regulation content information and the remaining amount information to be displayed in the distal display region, and then causes the display to shift to the proximal display region. However, when the regulation content information and the remaining amount information are to be displayed in the proximal display region for the multiple types of traffic regulation marks, arbitration is performed to switch the display of the traffic regulation mark having a lower priority set by the priority setting unit 207 from the proximal display region to the distal display region. Further, when the regulation content information and the remaining amount information whose display region is switched from the proximal display region to the distal display region exist for the multiple types of traffic regulation marks, the information on those traffic regulation marks is displayed in the distal display region in order according to the priority set by the priority setting unit 207. Details of the display control of the regulation content information and the remaining amount information by the display control unit 208 will be described later.

In addition, the display control unit 208 may be configured to switch whether to display information indicating the remaining travel distance or information indicating the remaining travel time as the remaining amount information in accordance with a selection by the driver accepted through the operation device 21. Information indicating both of the remaining travel distance and the remaining travel time may be displayed. Alternatively, the display control unit 208 may be configured to switch the presence or absence of display on the HUD 231 or to selectively cancel the display of the regulation content information and the remaining amount information for the identified traffic regulation marks in accordance with the selection by the driver accepted through the operation device 21.

<Regulation Display Control Related Process in HCU 20>

Figure 4:
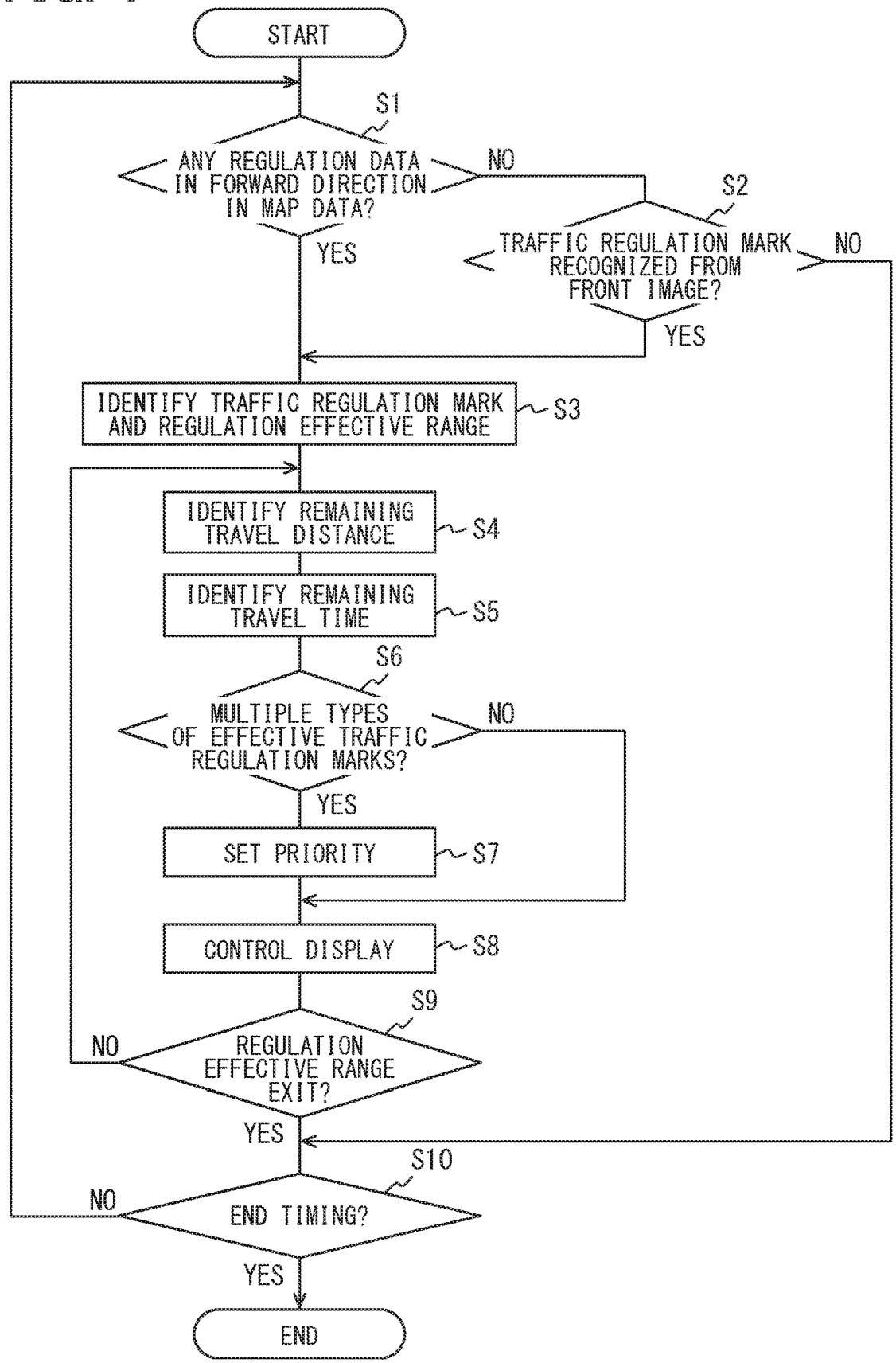
FIG. 4 is a flowchart showing an exemplary flow of a regulation display control related process in the HCU.

Next, with reference to a flowchart of FIG. 4, an exemplary flow of a process related to the control of the display of the traffic regulation marks by the HUD 231 in the HCU 20 (hereinafter, the regulation display control related process) will be described. The flowchart of FIG. 4 may be configured to be started when a power of the HUD 231 is turned on and a function of the HUD 231 is turned on. The function of the HUD 231 may be switched on and off in accordance with an input operation received by the operation device 21. The power of the HUD 231 may be switched on and off in accordance with on and off of a switch (hereinafter referred to as a power switch) for starting an internal combustion engine or a motor generator of the host vehicle.

First, in Step S1, in the case where the regulation data linked to the link ahead of the course of the host vehicle exists (YES in S1), the process proceeds to Step S3. On the other hand, if the regulation data does not exist (NO in S1), the process proceeds to Step S2. In Step S2, when the traffic regulation mark is recognized from a front image (YES in Step S2), the process proceeds to Step S3. On the other hand, when the traffic regulation mark is not recognized from the front image (NO in S2), the process proceeds to Step S10.

In Step S3, the mark identification unit 203 identifies a traffic regulation mark existing ahead of the course of the host vehicle and a regulation effective range for the traffic regulation mark. In Step S4, the remaining amount identification unit 204 identifies a remaining travel distance as the starting remaining amount or the ending remaining amount.

In S4, the remaining amount identification unit 204 identifies the remaining travel distance as the starting remaining amount of the regulation effective range before the host vehicle enters the regulation effective range, and the remaining amount identification unit 204 identifies the remaining travel distance as the ending remaining amount of the regulation effective range after the host vehicle has entered the regulation effective range.

In Step S5, the remaining amount identification unit 204 identifies the remaining travel time as the starting remaining amount or the ending remaining amount. In S5, before the host vehicle enters the regulation effective range, the remaining amount identification unit 204 identifies the remaining travel time as the starting remaining amount of the regulation effective range, and after the host vehicle has entered the regulation effective range, the remaining amount identification unit 204 identifies the remaining travel time as the ending remaining amount of the regulation effective range.

In Step S6, if there are multiple types of effective traffic regulation marks in which the host vehicle is located within the regulation effective range (YES in Step S6), the process proceeds to Step S7. On the other hand, if only one type of effective traffic regulation mark exists (NO in S6), the process proceeds to Step S8. In Step S7, the priority setting unit 207 sets the priority of each of the multiple types of effective traffic regulation marks.

In Step S8, the display control unit 208 performs a display control to display the regulation content information and the remaining amount information of the effective traffic regulation marks on the HUD 231. The display control unit 208 causes the display region in which the regulation content information and the remaining amount information are displayed to be switched between the proximal display region and the distal display region in accordance with the situation of the host vehicle with respect to the regulation effective range. When there are the multiple types of effective traffic regulation marks, the display control unit 208 also arbitrates the display of the regulation content information and the remaining amount information in accordance with the priority set in S7.

In Step S9, when the host vehicle exits from the regulation effective range as the target (YES in S9), the display control unit 208 causes the display of the regulation content information and the remaining amount information of the regulation effective range which have become ineffective to be deleted, and the process proceeds to Step S10. On the other hand, if the host vehicle has not exited from the target regulation effective range (NO in S9), the process returns to S4 to repeat the above process. When there are the multiple regulation effective ranges in which the host vehicle is located, and the host vehicle has exited from a part of the regulation effective ranges, the display of the regulation content information and the remaining amount information in the regulation effective range in which the host vehicle has not exited is continued.

In Step S10, when the present time is an end timing of the regulation display control related process (YES in S10), the regulation display control related process is terminated. On the other hand, if the present time is not the end timing of the regulation display control related process (NO in S10), the process returns to S1 and the above process is repeated. Examples of the end timing of the regulation display control related process include a timing when the power switch of the host vehicle is turned off, a timing when the function of the HUD 231 is turned off, and the like.

<Example of Display Control when there is One Effective Traffic Regulation Mark>

Figure 5:
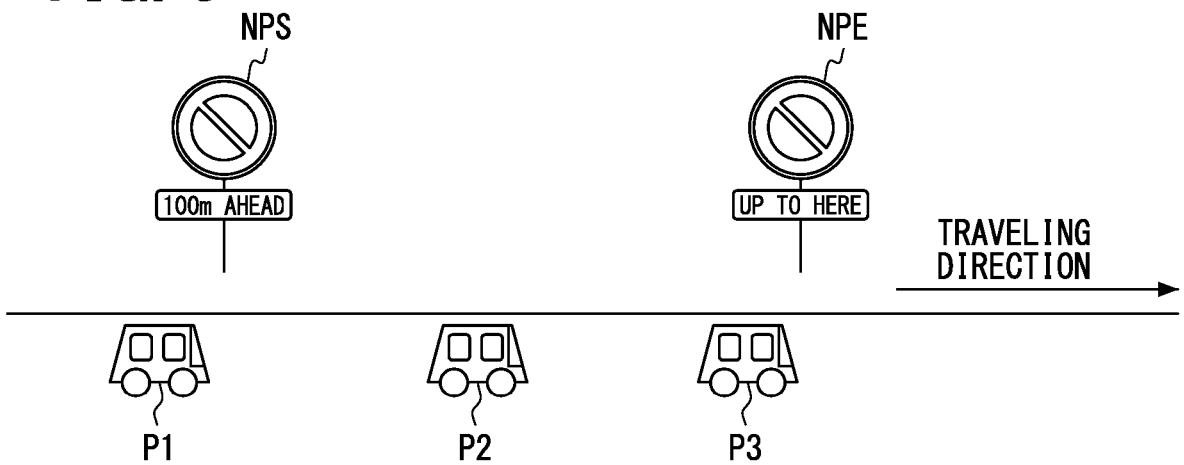
FIG. 5 is a schematic diagram showing an example of a situation of a host vehicle with respect to a regulation effective range.
Figure 6:
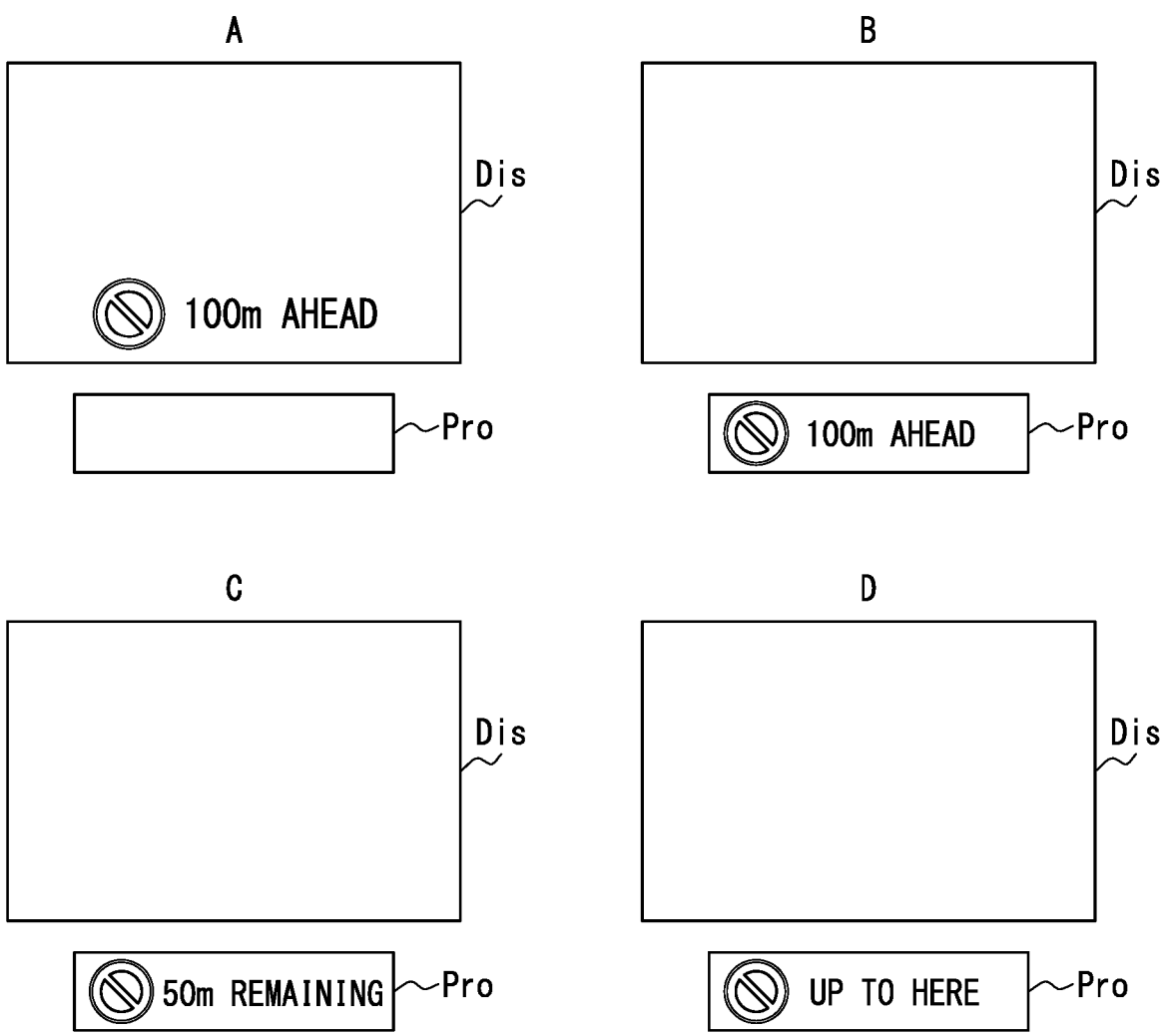
FIG. 6 is a diagram showing one example of the display of regulation content information and remaining amount information in a proximal display region and a distal display region according to a travel situation of the host vehicle.

In this example, an example of the display control by the display control unit 208 in the case where there is one type of effective traffic regulation mark (that is, a single type) will be described with reference to FIGS. 5 and 6. In FIGS. 5 and 6, a case in which the traffic regulation mark is "no parking" and the regulation effective range is 100 m will be described as an example. FIG. 5 is a schematic diagram showing an example of the situation of the host vehicle with respect to the regulation effective range. FIG. 6 is a diagram showing an example of the display of the regulation content information and the remaining amount information in the proximal display region and the distal display region according to the traveling situation of the host vehicle.

A symbol NPS of FIG. 5 shows signs such as the "no parking" of the regulation sign and the auxiliary sign provided at a start position of the regulation effective range, and a symbol NPE shows signs such as the "no parking" of the regulation sign and the auxiliary sign provided at an end position of the regulation effective range. In FIG. 5, symbols P1 to P3 indicate vehicle positions of the host vehicle. P1 indicates a vehicle position at which the sign NPS and a front portion of the host vehicle are located at the same position, that is, the vehicle position at the time when the host vehicle enters the regulation effective range corresponding to the regulation sign of "no parking" (hereinafter, the regulation effective range of "no parking"). P2 indicates a vehicle position when the host vehicle is located between the sign NPS and the sign NPE, that is, the vehicle position when the host vehicle is located within the regulation effective range of "no parking". P3 indicates a vehicle position when the host vehicle passes the sign NPE, that is, the vehicle position at the time of exiting the regulation effective range of "no parking". Also, Pro in FIG. 6 shows the proximal display region and Dis shows the distal display region. The same applies to the subsequent FIGS. 8 to 10.

When the host vehicle enters the regulation effective range of "no parking" (see P1 in FIG. 5), as shown in A in FIG. 6, an icon image imitating the sign of "no parking" as the regulation content information and a text such as "this end 100 m" as the remaining amount information indicating the ending remaining amount are displayed in a distal display region Dis. This makes it possible for the driver to recognize the newly identified traffic regulation mark. The display of the regulation content information and the remaining amount information at that time is displayed on the lower side of the distal display region so as not to obstruct the visibility of the driver. However, the above display is temporary, and the display is switched to a display of a proximal display region Pro as shown in B in FIG. 6.

During a period from a time after the host vehicle enters the regulation effective range of "no parking" to a time when the host vehicle exits from the regulation effective range (refer to P2 in FIG. 5), an icon image imitating the sign of "no parking" and a text such as "remaining 50 m" indicating the ending remaining amount are displayed in the proximal display region Pro, as shown in C in FIG. 6. The text indicating the ending remaining amount may be updated and displayed in accordance with the ending remaining amount sequentially identified by the remaining amount identification unit 204. The same applies to a display control example in which there are two types of effective traffic regulation marks and a display control example in which there are three or more types of effective traffic control marks, which will be described later.

Then, at the time point when the host vehicle leaves the regulation effective range of "no parking" (refer to P3 in FIG. 5), an icon image imitating the sign of "no parking" and a text such as "up to here" as the ending remaining amount are displayed in the proximal display region Pro, as shown in D in FIG. 6. The above display indicates that the traffic regulation mark of "no parking" is made ineffective. The text to be displayed as the ending remaining amount may be configured to display the contents recognized from the auxiliary sign provided at the end point of the regulation effective range. In addition, the text to be displayed as the ending remaining amount may be a "remaining 0 m" text or the like. The same applies to a display control example in which there are two types of effective traffic regulation marks and a display control example in which there are three or more types of effective traffic control marks, which will be described later.

When the host vehicle exits from the regulation effective range of "no parking", the display control unit 208 deletes the regulation content information and the remaining amount information which have been displayed in the proximal display region Pro until then. In other words, the display control unit 208 terminates the display of the regulation content information and the remaining amount information corresponding to the exited regulation effective range. For the purpose of notifying the driver of the entry into the regulation effective range, the display control unit 208 may be configured to display the remaining amount information indicating the starting remaining amount of the regulation effective range together with the regulation content information in the distal display region Dis before the host vehicle enters the regulation effective range.

<Display Control Example when there are two types of Effective Traffic Regulation Marks>

Figure 7:
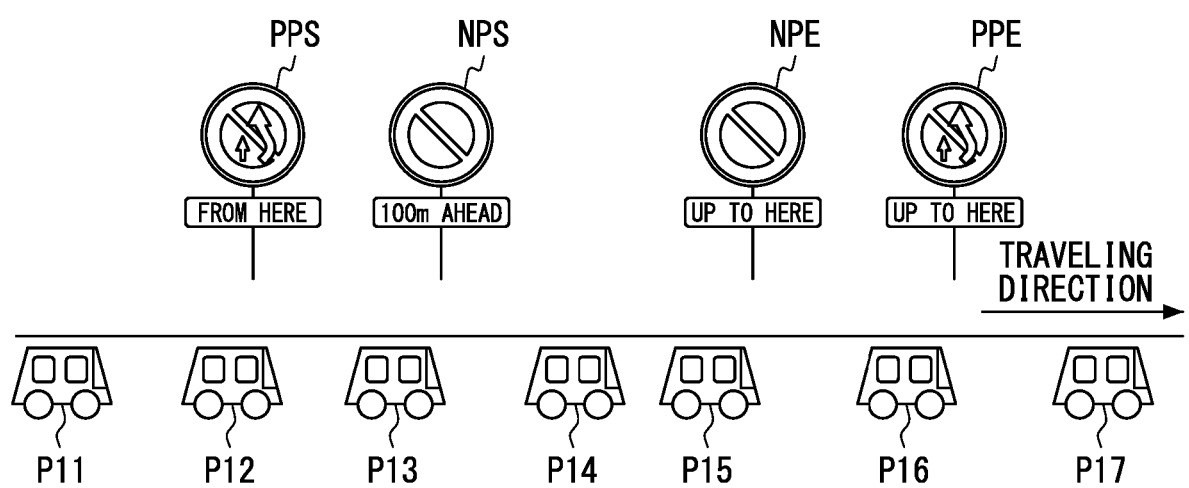
FIG. 7 is a schematic diagram showing an example of the situation of the host vehicle with respect to the regulation effective range.
Figure 8:
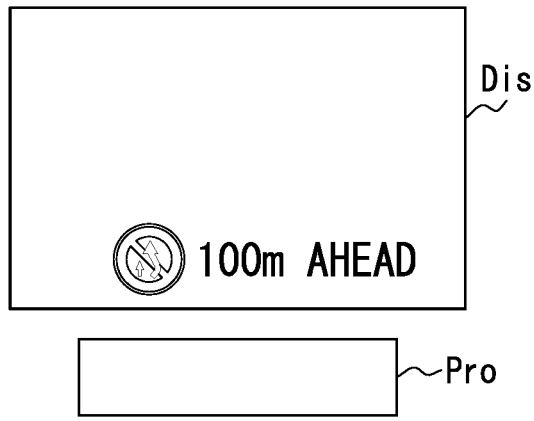
FIG. 8 is a diagram showing another example of a display of the regulation content information and the remaining amount information in the proximal display region and the distal display region according to the travel situation of the host vehicle.
Figure 8:
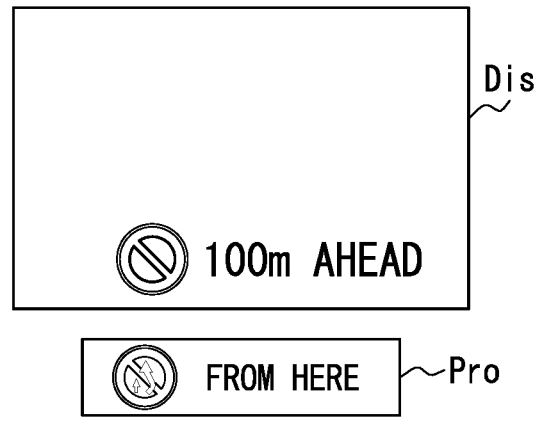
Figure 8:
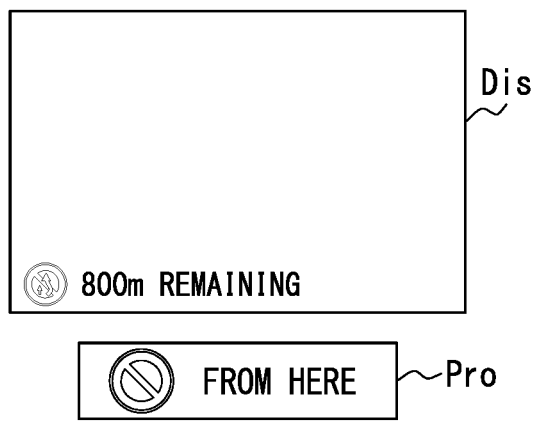
Figure 8:
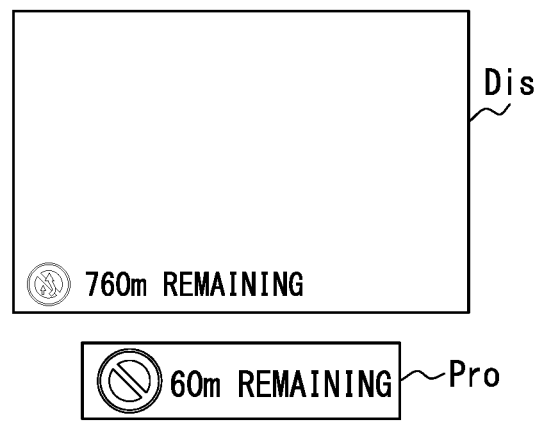
Figure 8:
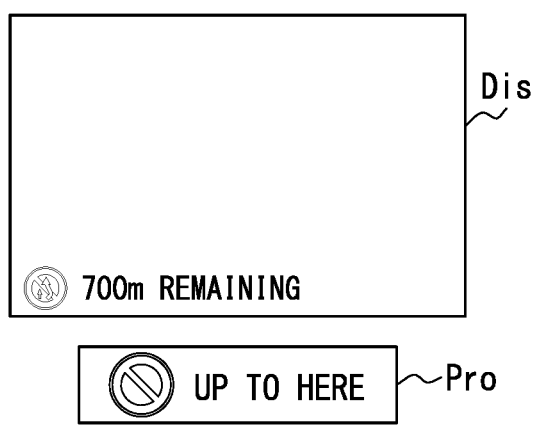
Figure 8:
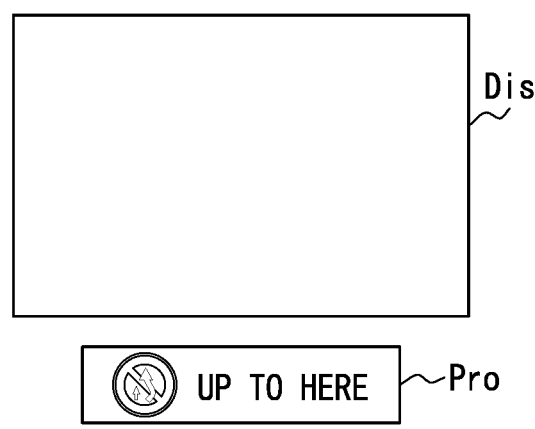
Figure 9:
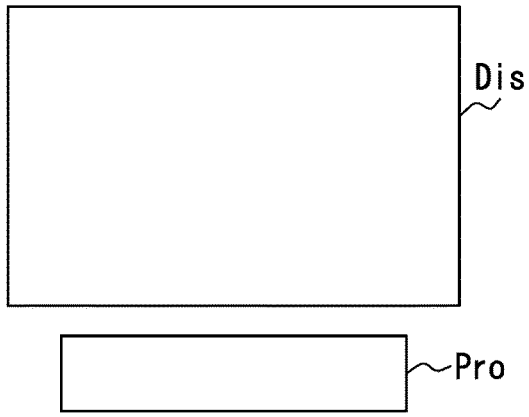
FIG. 9 is a diagram showing another example of a display of the regulation content information and the remaining amount information in the proximal display region and the distal display region according to the travel situation of the host vehicle.
Figure 9:
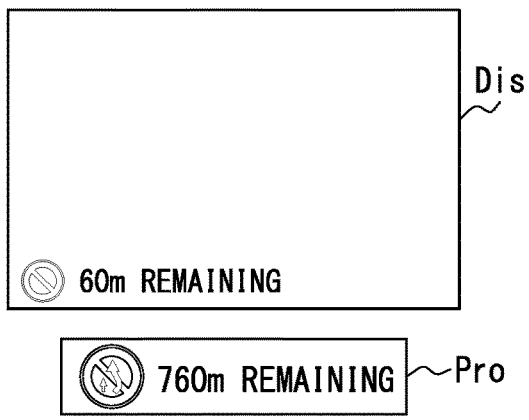
Figure 9:
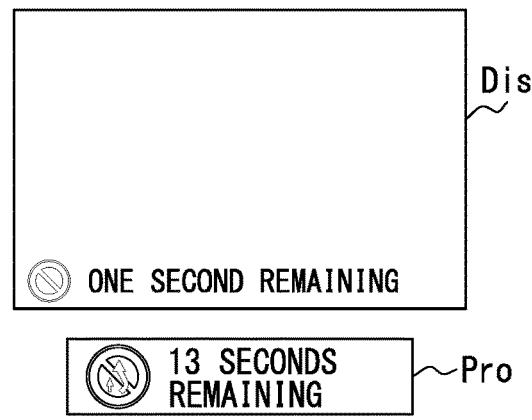

Next, an example of the display control by the display control unit 208 in the case where there are two types of effective traffic regulation marks will be described with reference to FIGS. 7 to 9. In FIGS. 7 to 9, an example will be described in which the traffic regulation marks are "no overtaking" and "no parking" and the regulation effective range of "no overtaking" is 800 m, and the regulation effective range of "no parking" is 100 m. In addition, in FIGS. 7 to 9, a case in which the regulation effective range of "no parking" overlaps in the middle of the regulation effective range of "no overtaking" will be described as an example. FIG. 7 is a schematic diagram showing an example of the situation of the host vehicle with respect to the regulation effective range. FIGS. 8 and 9 are diagrams showing an example of display of the regulation content information and the remaining amount information in the proximal display region and the distal display region according to the travel situation of the host vehicle.

The NPS of FIG. 7 shows signs such as a regulation sign and an auxiliary sign of "no parking" provided at the start position of the regulation effective range of "no parking", and the NPE shows signs such as the regulation sign and the auxiliary sign of "no parking" provided at the end position of the regulation effective range. The PPS of FIG. 7 shows signs such as a regulation sign and an auxiliary sign of "no overtaking" provided at the start position of the regulation effective range of "no overtaking", and the PPE shows signs such as the regulation sign and the auxiliary sign of "no overtaking" provided at the end position of the regulation effective range.

P11 to P17 in FIG. 7 indicate vehicle positions of the host vehicle. P11 indicates a vehicle position before the vehicle enters the regulation effective range of "no overtaking". P12 indicates a vehicle position at which the sign PPS and the front portion of the host vehicle are located at the same position, that is, the vehicle position at the time when the host vehicle enters the regulation effective range corresponding to the regulation sign of "no overtaking" (hereinafter referred to as the regulation effective range of "no overtaking"). P13 indicates a vehicle position at which the sign NPS and the front portion of the host vehicle are at the same position, that is, the vehicle position at the time when the host vehicle enters the regulation effective range of "no parking". P14 shows a vehicle position in the case where the host vehicle is located within both of the regulation effective range of "no overtaking" and the regulation effective range of "no parking". P15 indicates a vehicle position when the host vehicle passes through the sign NPE, that is, the vehicle position at the time of exiting from the regulation effective range of "no parking". P16 indicates a vehicle position when the host vehicle passes through the sign PPE, that is, the host vehicle position at the time of exiting from the regulation effective range of "no overtaking". P17 indicates a vehicle position after leaving the regulation effective range of "no overtaking".

Before the host vehicle enters the regulation effective range of "no overtaking" (refer to P11 in FIG. 7), as shown in E in FIG. 8, an icon image imitating the sign of "no overtaking" as the regulation content information and a text such as "100 m ahead" as the remaining amount information indicating the starting remaining amount are displayed in the distal display region Dis.

When the host vehicle enters the regulation effective range of "no overtaking" (refer to P12 in FIG. 7), as shown in F of FIG. 8, an icon image imitating the sign of "no overtaking" as the regulation content information and a text such as "from here" indicating that the regulation effective range starts are displayed in the proximal display region Pro. In the distal display region Dis, an icon image imitating a sign of "no parking" as the regulation content information and a text such as "100 m ahead" as the remaining amount information indicating the starting remaining amount are displayed.

Instead of displaying the text indicating the start of the regulation effective range in the proximal display region Pro, a text such as "800 m ahead" may be displayed as the remaining amount information indicating the ending remaining amount. In addition, after the text "from here" is temporarily displayed, the display may be switched to the text "800 m ahead".

Next, when the host vehicle enters the regulation effective range of "no parking" (refer to P13 in FIG. 7), as shown in G in FIG. 8, an icon image imitating the sign of "no parking" as the regulation content information, corresponding to the traffic regulation mark to be newly made effective, and a text such as "from here" indicating that the regulation effective range starts are displayed in the proximal display region Pro. In the distal display region Dis, the icon image imitating the sign of "no overtaking" as the regulation content information corresponding to the traffic regulation mark that has already been made ineffective, and the text such as "remaining 800 m" as the remaining amount information indicating the ending remaining amount are displayed. As the information corresponding to the traffic regulation mark to be newly effective is displayed in the proximal display region Pro, the information corresponding to the traffic regulation mark which has already been effective may be shifted from the display in the proximal display region Pro to the display in the distal display region Dis.

When the host vehicle is located in a region where the regulation effective range of "no overtaking" and the regulation effective range of "no parking" overlap with each other (refer to P14 in FIG. 7), the icon image imitating the sign of "no parking" corresponding to the regulation effective range of "no parking" whose ending remaining amount is smaller and the text such as "remaining 60 m" indicating the ending remaining amount are displayed in the proximal display region Pro, as shown in H in FIG. 8. On the other hand, in the distal display region Dis, the icon image imitating the sign of "no overtaking" corresponding to the regulation effective range of "no overtaking" having a larger ending remaining amount and the text such as "remaining 760 m" indicating the ending remaining amount are displayed. According to the above configuration, since the remaining amount information about the regulation effective range whose ending remaining amount is smaller is preferentially displayed in the proximal display region Pro, the driver can more easily recognize the situation of the host vehicle with respect to each regulation effective range indicated by the multiple types of traffic regulation marks.

The display control unit 208 may be configured to display the information about the traffic regulation mark having a higher priority set by the priority setting unit 207 in the proximal display region Pro, and to display the information about the traffic regulation mark having a lower priority in the distal display region Dis. When the display region displaying the remaining amount information about the traffic regulation mark having a lower priority is switched from the proximal display region Pro to the distal display region Dis, the display control unit 208 causes the remaining amount information to be displayed in the distal display region Dis in a manner less conspicuous than that originally displayed in the distal display region Dis. The same may be applied to the regulation content information.

In the present specification, the "originally" refers to a point in time at which the host vehicle enters the regulation effective range of the above traffic regulation mark. Examples of the inconspicuous mode include a display mode in which a size to be displayed is reduced, a display mode in which a position to be displayed is set to a position deviated from the center of the distal display region Dis, and the like. This makes it possible that the driver more easily distinguishes the information displayed in the distal display region Dis when the host vehicle enters the regulation effective range from other information while not obstructing the driver's field of view.

Then, at the time point when the host vehicle leaves the regulation effective range of "no parking" (refer to P15 in FIG. 7), an icon image imitating the sign of "no parking" and a text such as "up to here" as the ending remaining amount are displayed in the proximal display region Pro, as shown in I in FIG. 8. The above display indicates that the traffic regulation mark of "no parking" is made ineffective. In the distal display region Dis, the regulation content information and the remaining amount information corresponding to the regulation effective range of "no overtaking" are continuously displayed. As a specific example, an icon image imitating the sign of "no overtaking" and the text such as "remaining 700 m" indicating the ending remaining amount are displayed.

Then, at the time point when the host vehicle leaves the regulation effective range of "no overtaking" (refer to P16 in FIG. 7), an icon image imitating the sign of "no overtaking" and a text such as "up to here" as the ending remaining amount are displayed in the proximal display region Pro, as shown in J in FIG. 8. The above display indicates that the traffic regulation mark of "no overtaking" is made ineffective. The display of the regulation content information and the remaining amount information corresponding to the regulation effective range of "no overtaking" in the distal display region Dis is terminated.

When the host vehicle exits from the regulation effective range of "no overtaking" (refer to P17 in FIG. 7), the regulation content information and the remaining amount information displayed in the proximal display region Pro are deleted as shown in K in FIG. 9. Further, since there is no effective traffic regulation mark, the regulation content information and the remaining amount information are not displayed also in the distal display region Dis, as shown by K in FIG. 9.

In H in FIG. 8, an example in which the priority of the traffic regulation mark whose ending remaining amount is smaller is set to be higher is shown, but the present disclosure is not necessarily limited to the above example. Depending on the setting of the priority in the priority setting unit 207, as shown by L in FIG. 9, the regulation content information and the remaining amount information corresponding to the regulation effective range of "no overtaking" may be displayed in the proximal display region Pro, while the regulation content information and the remaining amount information corresponding to the regulation effective range of "no parking" may be displayed in the distal display region Dis.

In FIGS. 6 and 8, the remaining travel distance is displayed as the starting remaining amount and the ending remaining amount, but the present disclosure is not necessarily limited to the above configuration. For example, as shown by M in FIG. 9, the remaining travel time may be displayed as the remaining amount.

<Display Control Example when three or more Effective Traffic Regulation Marks are used>

Figure 10:
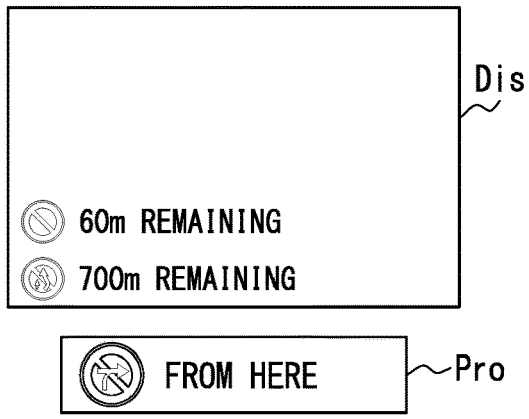
FIG. 10 is a diagram showing another example of a display of the regulation content information and the remaining amount information in the proximal display region and the distal display region according to the travel situation of the host vehicle.

Next, an example of the display control by the display control unit 208 in the case where there are three or more types of effective traffic regulation marks will be described with reference to FIG. 10. In FIG. 10, a description will be given by taking an example in which the traffic regulation mark is of three types, for example, "no overtaking", "no parking" and "no vehicle crossing". It should be noted that a configuration other than the case where the regulation effective ranges of the three kinds of traffic regulation marks are located in the overlapping region is the same as the case where the above-mentioned effective traffic regulation marks are two or more kinds, and therefore a description of the same configurations will be omitted.

When the host vehicle is located in a region where the regulation effective range of "no overtaking", the regulation effective range of "no parking", and the regulation effective range of "no vehicle crossing" overlap with each other, the regulation content information and the remaining amount information about the traffic regulation mark having the highest priority set by the priority setting unit 207 are displayed in the proximal display region Pro. On the other hand, the regulation content information and the remaining amount information for the remaining traffic regulation marks may be arranged and displayed in the distal display region Dis in descending order of the priority set by the priority setting unit 207 from the side close to the proximal display region Pro.

According to the above configuration, since the regulation content information and the remaining amount information are arranged in the order of the priorities to be set, the driver can more easily recognize the situation of the host vehicle with respect to the respective regulation effective ranges indicated by the three or more types of traffic regulation marks. For example, in the case where the priority of the traffic regulation mark corresponding to the regulation effective range whose ending remaining amount is smaller is set to be higher, the information about the regulation effective range whose ending remaining amount is smaller is displayed at a position closer to the proximal display region Pro, so that the driver can intuitively recognize the order of the remaining amounts for each regulation effective range.

In addition, the display control unit 208 may display the regulation content information and the remaining amount information of the traffic regulation mark having a higher priority set by the priority setting unit 207 in a larger size, thereby achieving the same effect.

In the example described above, the description has been made by taking "no overtaking," "no parking," and "no vehicle crossing" as examples of the traffic regulation mark, but the present disclosure is not necessarily limited to the above configuration. The embodiment can be configured to be applied to other traffic regulation marks such as "speed limit" if a regional effective range is stipulated to the regulation indicated by the traffic regulation mark.

<Conclusion of First Embodiment>

According to the configuration of the first embodiment, since the mark identification unit 203 identifies the regulation effective range indicated by the traffic regulation mark on the course of the host vehicle, and when the host vehicle enters the regulation effective range, the regulation content information indicating the content of the regulation in the regulation effective range is displayed in the display region. For that reason, the regulation content information can be displayed in the display region with high accuracy when the host vehicle is located in the effective range. Further, when the host vehicle enters the regulation effective range, the remaining amount information indicating the ending remaining amount required until the end of the regulation effective range is displayed in the display region, so that the driver can more easily recognize the situation of the host vehicle with respect to the regulation effective range. This makes it possible to allow the driver to easily recognize the situation of the host vehicle with respect to the effective range of the traffic regulation mark while being capable of more accurately presenting the content of the traffic regulation mark to the driver.

In addition, since the remaining amount information indicating the starting remaining amount required until the host vehicle enters the regulation effective range is displayed in the display region when the host vehicle enters the regulation effective range, the driver can more easily recognize the situation of the host vehicle with respect to the regulation effective range.

In addition, since the display region in which the remaining amount information is displayed is switched according to the situation of the host vehicle with respect to the regulation effective range (that is, a positional relationship), the driver can more easily recognize the situation of the host vehicle with respect to the regulation effective range by the transition of the display region in which the remaining amount information is displayed. As a specific example, the driver can more easily recognize that the driver has newly entered the regulation effective range by initially displaying the remaining amount information in the distal display region and then shifting the remaining amount information to the proximal display region at the time of entering the regulation effective range.

Further, even when the host vehicle is located in a region where the regulation effective ranges indicated by the multiple types of traffic regulation marks overlap with each other, the display region for displaying the remaining amount information for each regulation effective range is switched to another display region according to the situation of the host vehicle, so that the driver can more easily recognize the situation of the host vehicle with respect to each regulation effective range. For example, since the remaining amount information is initially displayed in the distal display region at the time of entering the regulation effective range, the driver can more easily recognize which regulation effective range is newly entered. In addition, the remaining amount information for each regulation effective range is displayed in the display region, thereby being capable of more easily recognizing the situation of the host vehicle for each regulation effective range.

Further, since the display region for displaying the regulation content information and the remaining amount information is a region for superimposing and displaying the virtual image on the foreground of the host vehicle by the HUD 231, the shift of the sight line of the driver for confirming the regulation content information and the remaining amount information can be reduced.

Second Embodiment

In the first embodiment, a configuration in which the multiple display regions for displaying the regulation content information and the remaining amount information are virtual image display regions respectively corresponding to multiple projection regions of the HUD 231 has been exemplified, but the present disclosure is not necessarily limited to the above configuration. For example, the multiple display regions for displaying the regulation content information and the remaining amount information may be a display region by the HUD 231 and a display region of the display device 23 of a type other than the HUD 231. The display device 23 used as the display device 23 of a type other than the HUD 231 is preferably the combination meter 232, the CID 233, or the like described above so that the shift of the sight line of the driver can be reduced.

For example, a configuration may be adopted in which a display region by the HUD 231 is used as the distal display region of the first embodiment, and the combination meter 232 or the display region of the CID 233 is used as the proximal display region of the first embodiment. It should be noted that a configuration may be adopted in which the display region by the HUD 231 is used as the distal display region of the first embodiment, the display region by the CID 233 is used as the proximal display region of the first embodiment, and the combination meter 232 is used as the proximal display region of the first embodiment. In this instance, it is preferable that the display region of the CID 233 and the display region of the combination meter 232 are aligned in the vertical direction from the viewpoint of reducing the shift of the sight line of the driver.

Third Embodiment

In the first embodiment and the second embodiment, the case where there are two display regions in which the remaining amount information can be displayed has been described, but the present disclosure is not necessarily limited to the above case. For example, the remaining amount information may be displayed in three or more display regions. In this case as well, after the remaining amount information is displayed in the display region for displaying the image that appears more distal from the driver seated in the driver's seat among the multiple display regions, the display region for displaying the remaining amount information may be switched to the display region for displaying the image that appears more proximal from the driver seated in the driver's seat. The same applies to the regulation content information.

In addition, when the remaining amount information about multiple types of traffic regulation marks is displayed in the same display region, the remaining amount information having the lower priority set by the priority setting unit 207 may be displayed in the display region for displaying the image seen more distally from the driver seated in the driver's seat. In the case where the remaining amount information about the multiple types of traffic regulation marks is displayed in the display region for displaying the image seen most distally from the driver seated in the driver's seat, the remaining amount information may be displayed in accordance with the priority in the same manner as described in the first embodiment.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle display control device for a vehicle comprising:
    a display control unit that controls a display device for displaying information in a display region in front of a driver's seat of a vehicle;
    an effective range identification unit that identifies an effective range of a traffic regulation indicated by a traffic regulation mark, which is at least one of a traffic sign or a road marking on a travelling road of the vehicle; and
    a remaining amount identification unit that identifies a remaining amount, which is at least one of a remaining travel distance and a remaining travel time required from a vehicle position of the vehicle to an end point of the effective range, wherein:
    when the vehicle enters into the effective range, the display control unit controls the display device to display remaining amount information indicating the remaining amount identified by the remaining amount identification unit, in addition to traffic regulation content information indicating a content of the traffic regulation in the effective range, in the display region;
    the display region includes a plurality of display areas at different positions from each other;
    the display control unit switches the display region for displaying the remaining amount information according to a travelling situation of the vehicle with respect to the effective range;
    the display control unit controls to display the remaining amount information in one of the display areas for displaying an image that appears farther from a driver seated in the driver's seat when the vehicle enters into the effective range; and
    the display control unit successively switches the one of the display areas for displaying the remaining amount information to another one of the display areas for displaying the image that appears nearer from the driver seated in the driver's seat.

2. The vehicle display control device according to claim 1, wherein:
    the display region includes two display areas at different positions from each other;
    the display control unit controls to display the remaining amount information in the one of the display areas as a far position display area for displaying the image that appears farther from the driver seated in the driver's seat when the vehicle enters into the effective range;
    the display control unit successively switches the one of the display areas for displaying the remaining amount information to another one of the display areas as a near position display area for displaying the image that appears nearer from the driver seated in the driver's seat; and
    when the vehicle is located in a region in which a plurality of effective ranges indicated by a plurality of types of traffic regulation marks overlap with each other, and when each of the display areas that displays the remaining amount information corresponding to a respective type of the traffic regulation marks is the near position display area, the display control unit switches the one of the display areas, for displaying the remaining amount information corresponding to one of the types of traffic regulation marks having a low priority which is preliminarily set, to the far position display area.

3. The vehicle display control device according to claim 2, wherein:
    the priority is preliminarily set to be higher for the remaining amount information of which the remaining amount identified by the remaining amount identification unit is small.

4. The vehicle display control device according to claim 2, wherein:
    the priority is preliminarily set according to a selection by the driver received through a user interface.

5. The vehicle display control device according to claim 2, wherein:
    the priority is preliminarily set according to the types of the traffic regulation marks.

6. The vehicle display control device according to claim 2, wherein:
    the priority is preliminarily set according to the types of the traffic regulation marks and a traveling state of the vehicle.

7. The vehicle display control device according to claim 2, wherein:
    when the display control unit switches the one of the display areas, for displaying the remaining amount information corresponding to one of the types of traffic regulation marks having a low priority, from the near position display area to the far position display area, the display control unit controls to display the remaining amount information to be displayed in the far position display area in a display manner less conspicuous than an original display manner of the remaining amount information displayed in the far position distal display area when the vehicle enters into the effective range.

8. The vehicle display control device according to claim 2, wherein:
when the display control unit switches the one of the display areas, for displaying the remaining amount information corresponding to one of the types of traffic regulation marks having a low priority, from the near position display area to the far position display area, and when the remaining amount information, of which the one of the display areas is switched to the far position display area, corresponds to the plurality of types of traffic regulation marks, the display control unit controls to display the remaining amount information for the plurality of types of traffic regulation marks be arranged from the near position display area in a descending order of the priority.

9. The vehicle display control device according to claim 1, wherein:
the display device as a head-up display displays a virtual image of a display image visible for the driver by projecting the display image to one of a plurality of projection areas in front of the driver's seat of the vehicle; and
each of the plurality of display areas is a display area of the virtual image corresponding to a respective projection area of the display device.

10. The vehicle display control device according to claim 1, wherein:
each of the plurality of display areas is a display area for displaying information in a respective one of a plurality of display devices having different types.

11. A vehicle display unit for a vehicle comprising:
a display device that displays information in a display region in front of a driver's seat of a vehicle; and
the vehicle display control device according to claim 1.

12. A vehicle display control device for a vehicle comprising:
a processor, wherein:
the processor is configured to:
control a display device for displaying information in a display region in front of a driver's seat of a vehicle;
identify an effective range of a traffic regulation indicated by a traffic regulation mark, which is at least one of a traffic sign or a road marking on a travelling road of the vehicle; and
identify a remaining amount, which is at least one of a remaining travel distance and a remaining travel time required from a vehicle position of the vehicle to an end point of the effective range;
when the vehicle enters into the effective range, the processor is configured to control the display device to display remaining amount information indicating the remaining amount, in addition to traffic regulation content information indicating a content of the traffic regulation in the effective range, in the display region;
the processor is configured to control the display device to display the remaining amount information in one of a plurality of display areas for displaying an image of the display region that appears farther from a driver seated in the driver's seat when the vehicle enters into the effective range; and
the processor is configured to switch the one of the plurality of display areas for displaying the remaining amount information to another one of the plurality of display areas for displaying the image that appears nearer from the driver seated in the driver's seat.

* * * * *